United States Patent [19]

Voldman et al.

[11] Patent Number: 5,712,747
[45] Date of Patent: Jan. 27, 1998

[54] THIN FILM SLIDER WITH ON-BOARD MULTI-LAYER INTEGRATED CIRCUIT

[75] Inventors: Steven Howard Voldman, South Burlington, Vt.; Albert John Wallash, Morgan Hill, Calif.

[73] Assignee: International Business Machines Corporation, Armonk, N.Y.

[21] Appl. No.: 590,652

[22] Filed: Jan. 24, 1996

[51] Int. Cl.$^6$ .......................................... G11B 5/60
[52] U.S. Cl. .................................................. 360/103
[58] Field of Search ...................................... 360/103

[56] References Cited

U.S. PATENT DOCUMENTS

| | | | |
|---|---|---|---|
| 4,403,238 | 9/1983 | Clark | 357/30 |
| 4,646,128 | 2/1987 | Carson et al. | 357/74 |
| 4,809,103 | 2/1989 | Lazzari | 360/103 |
| 4,881,144 | 11/1989 | Yuito et al. | 360/123 |
| 5,014,145 | 5/1991 | Hosokawa et al. | 360/104 |
| 5,025,304 | 6/1991 | Reisman et al. | 357/71 |
| 5,055,969 | 10/1991 | Putnam | 361/398 |
| 5,168,078 | 12/1992 | Reisman et al. | 437/195 |
| 5,278,712 | 1/1994 | Sugaya | 360/104 |
| 5,279,991 | 1/1994 | Minahan et al. | 437/208 |
| 5,528,819 | 6/1996 | McKay | 360/103 |

FOREIGN PATENT DOCUMENTS

| | | | |
|---|---|---|---|
| 57-044213 | 3/1982 | Japan | G11B 5/12 |
| 58-118016 | 7/1983 | Japan | G11B 5/12 |
| 58-118017 | 7/1983 | Japan | G11B 5/12 |
| 58-208922 | 12/1983 | Japan | G11B 5/12 |
| 58-208925 | 12/1983 | Japan | G11B 5/28 |
| 59-168968 | 9/1984 | Japan | G11B 17/32 |
| 60-177418 | 9/1985 | Japan | G11B 5/31 |
| 62-217476 | 9/1987 | Japan | G11B 21/16 |
| 3-25717 | 4/1991 | Japan | G11B 5/60 |
| 3-192513 | 8/1991 | Japan | G11B 5/60 |
| 4-106714 | 4/1992 | Japan | G11B 5/60 |

OTHER PUBLICATIONS

C. L. Bertin, et al., "Evaluation of a three-Dimensional Memory Cube System", IEEE Transactions on Components, Hybrids, and Manufacturing Technology, vol. 16, No. 8, Dec. 1993.

E. Q. Bowers, et al., "Disk File With Arm-Mounted Electronics", IBM Technical Disclosure Bulletin, vol. 22, No. 8B, Jan. 1980.

*Primary Examiner*—A. J. Heinz
*Attorney, Agent, or Firm*—Baker, Maxham, Jester & Meador

[57] ABSTRACT

A thin film slider with an on-board multi-layer integrated circuit includes a substrate with an air bearing surface and a substantially parallel upper surface spanned by a deposit end. A magnetic head being formed at the deposit end, positioned to magnetically exchange data with a magnetic recording medium that passes beneath the air bearing surface. The upper surface bears an integrated multi-layer accessory circuit, which may be prepared using the CUBE process. Hence, components and vias of the different circuit layers are attached by interconnections that span the edges of the circuit layers. The accessory circuit preferably includes one or more memory devices, such as a cache memory, a DRAM circuit, an EPROM circuit, or another memory circuit appropriate to the application. In embodiments where the magnetic head is a magnetoresistive ("MR") head, the accessory circuit may also include a pre-amplifier and a sensing circuit to support operation of the MR head. The accessory circuit may also include electrostatic discharge ("ESD") protection circuitry to increase the accessory circuit's resistance to damage caused by ESD.

19 Claims, 5 Drawing Sheets

THIN FILM SLIDER WITH ON-BOARD MULTI-LAYER INTEGRATED CIRCUIT

CROSS-REFERENCE TO RELATED APPLICATIONS

This application contains material that is related to material in the following U.S. patent applications:

| Ser. No.: 08/293,991 | Filed: 08/22/94 |
|---|---|
| Ser. No.: 08/324,203 | Filed: 10/17/94 |
| Ser. No.: 08/419,318 | Filed: 04/10/95 |
| Ser. No.: 08/515,611 | Filed: 08/14/95 |

All of these related applications are assigned to International Business Machines Corporation, the assignee of this application.

BACKGROUND OF THE INVENTION

1. Field of the Invention

The present invention relates to thin film sliders for use with magnetic data storage media such as disk and tape media. More particularly, the invention concerns a compact thin film slider that includes an integrated electromagnetic transducer as well as an integrated multi-layer accessory circuit.

2. Description of the Related Art

A typical data storage drive includes one or more data storage media and an appropriate number of mechanisms for writing and reading data on the storage media. In the case of magnetic tape based data storage drives, for instance, a tape head accesses a magnetic tape that contains data encoded in the form of magnetic signals. Magnetic disk type data storage drives ("disk drives") include one or more magnetic data storage disks and one or more head gimbal assemblies for each disk. Usually, each disk surface is matched to one head gimbal assembly.

As shown in FIG. 1, a head gimbal assembly 104 includes a hinged actuator arm 106 having a "slider" 108 at one end. The arm 106 may be referred to by others names as well, such as "suspension arm". The arm 106 is connected to a head gimbal assembly (not shown), which selectively positions the arm 106 in order to place slider 108 over a desired track on of the magnetic disk 110. When the disk 110 is rotated, the slider 108 rides ("flies") over a cushion of air (an "air bearing") slightly off of the surface of the disk 110, the cushion of air being generated by the high-speed movement of the disk 110.

The slider 108 includes an integrated electromagnetic transducer called a "head". The head magnetically exchanges data signals with the magnetic data storage disk 110. The head may be a "read head", "write head", or "read/write head" depending upon whether the slider 108 is to conduct read, write, or both read and write operations.

In many sliders, the head includes a magnetoresistive ("MR") head. Although MR heads are read-only devices, the MR sensor of an MR head may be supplemented with an inductive head to perform write operations.

An MR head employs an MR sensor comprising a thin stripe of conductive material, such as "permalloy" (i.e. nickel-iron). A typical MR stripe is 5 microns long, 1 micron high and 200 Angstroms thick. The length and thickness of the MR stripe are exposed at a surface of an MR head while the height is buried in the head body. When a magnetic medium, such as a magnetic disk, is rotated adjacent the MR head, magnetic fields from the medium induce a response in the MR stripe causing the stripe to change its resistance. When a constant current is applied to the MR sensor, a voltage is developed across the MR stripe, changing its magnitude in proportion to the change in resistance. The magnitude changes are then processed by channel electronics into playback signals representing information stored on the magnetic medium.

The slider is a key factor in determining the efficiency, density, speed, and accuracy with which data can be recorded on or read from magnetic recording media in a data storage drive. As engineers are increasing the performance requirements of their recording systems, they are concurrently researching improved designs for sliders.

One important design characteristic is the slider's size—smaller sliders can effectively increase the recording medium's storage capacity by storing data more compactly on the recording medium. As the size of various magnetic recording media shrinks, so must the corresponding sliders.

Another important design characteristic is a slider's functionality. Most sliders simply operate to effectuate write and read operations to/from a magnetic recording medium. However, a few advanced slider designs incorporate circuitry to perform additional functions. For example, Lazzari purports to show a silicon wafer having a magnetic head and an electronic circuit integrated to the head in U.S. Pat. No. 4,809,103. In another example, Beck et al. attempt to show a magnetic head assembly where circuitry for processing input and output signals from the head is incorporated in a chip located on an air bearing slider. J. W. Beck & B. Brezoczky, "Magnetic Head Assembly Including Head Circuitry," *IBM Technical Disclosure Bulletin*, Vol. 22, No. 1, June 1979. The circuitry of Beck et al. is said to include a head pre-amplifier and write electronics.

Including circuitry on-board the slider 108 yields a number of benefits. As shown in FIG. 1, a conductive channel 112 carries electrical signals between the slider 108 and arm electronics 114. Usually, these signals have a peak-to-peak voltage of about 0.05–0.1 mV. In a magnetic disk storage drive, there is often a significant amount of electrical interference (called "EMI" or "electrical noise") in proximity to the head gimbal assembly 104. A chief source of this noise, for example, is the motor (not shown) that rotates the disk 110. If the slider's signal is only amplified after transmission to the arm electronics 114, the arm electronics 114 must also amplify the electrical noise accumulated by the channel 112. However, if some amplification is performed at the slider, the arms electronics 114 will need to perform less magnification of signals from the slider 108, including any noise signals accumulated by the channel 112. Hence, including a sensing circuit on the slider 108 helps reduce noise carried via the conductive channel 112 to the arm electronics 114.

Another benefit of applying circuitry aboard a slider is compactness of the data storage drive. In modern data storage drives, size is critical, especially in particularly compact applications such as data storage drives for laptop computers. Each component must be as small as possible to minimize the drive's overall size. Obviously, the size of any circuit can be reduced if portions of that circuit can be removed and implemented elsewhere. In this respect, it is beneficial to include circuitry aboard a slider to help reduce the size of other circuitry.

Despite these benefits of sliders that incorporate various types of on-board accessory circuitry, some users might not be completely satisfied with known arrangements. In some known arrangements, for example, the slider's size may be appreciably increased by the addition of the on-board accessory circuitry. Moreover, some modern applications may require more extensive or complicated accessory circuitry than known sliders can accommodate. In addition, some especially small data storage drives may require sliders that are more compact than known sliders, yet still include the desired accessory circuits.

SUMMARY OF THE INVENTION

Broadly, the present invention concerns a thin film slider with a multi-layer integrated circuit on-board. The slider includes a substrate, such as a silicon substrate, or a substrate formed from a combination of TiC and $Al_2O_3$. The substrate includes an air bearing surface, an upper surface, and a deposit end. A head is provided at the deposit end, positioned to magnetically exchange data with a magnetic recording medium that passes beneath the bearing surface. The head may comprise a read head, a write head, or a read/write head.

The upper surface bears an integrated multi-layer accessory circuit. The accessory circuit preferably includes one or more memory devices, such as a cache memory, a DRAM circuit, an EPROM circuit, or another circuit appropriate to the application. The accessory circuit may also include a pre-amplifier and/or a sensing circuit, interposed between the head and arm electronics. Additionally, electrostatic discharge ("ESD") protection circuitry may be included in the accessory circuitry.

The slider of the invention may be prepared by using CUBE techniques, wherein components and vias of the different layers are attached by interconnections that span the circuit layers along their edge.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE ENVIRONMENT

Figure 1:
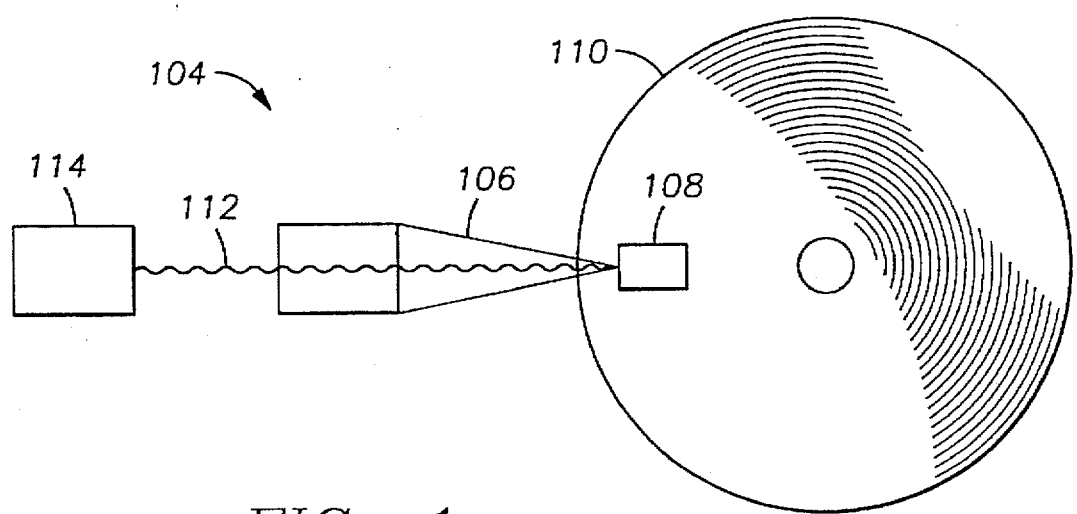
FIG. 1 is a diagram showing the components of a head gimbal assembly in relation to a magnetic data storage disk.
Figure 2:
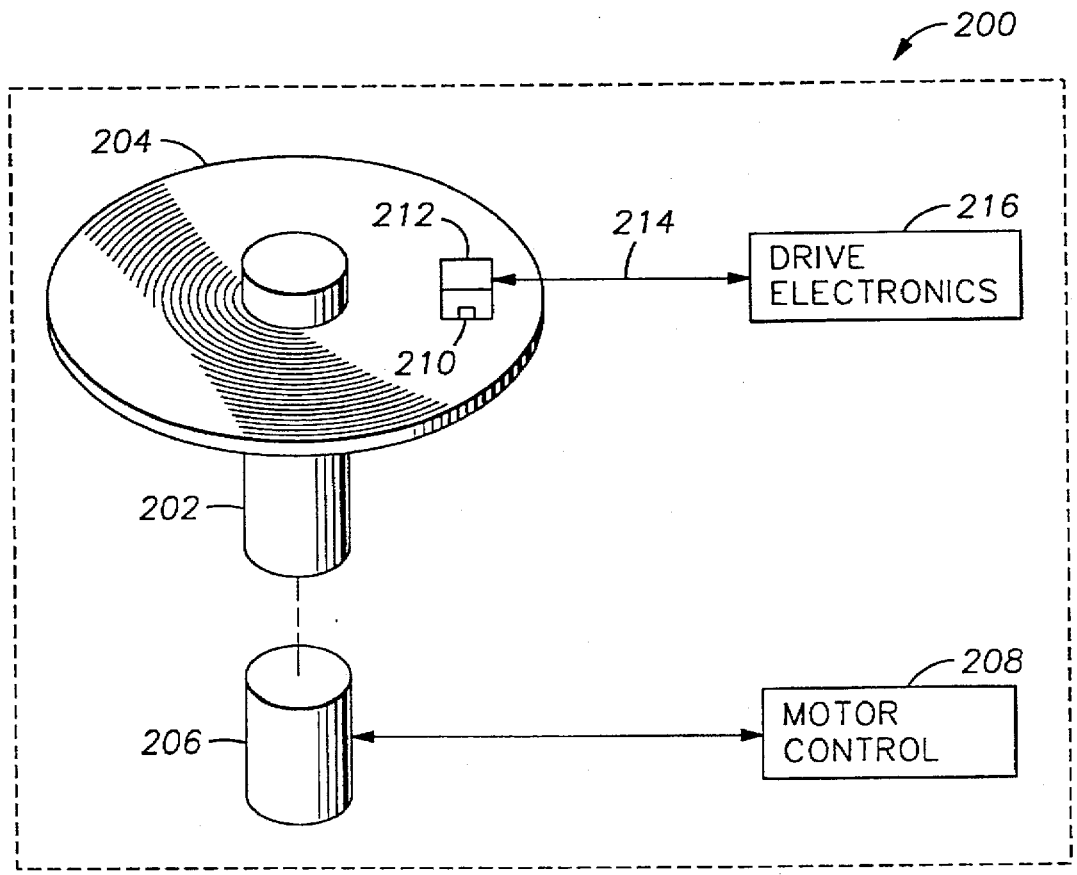
FIG. 2 is a schematic diagram of a typical disk drive.

FIG. 2 depicts an exemplary hardware environment of the present invention. The invention may be implemented in the context of various magnetic data storage media, such as hard drive disks, floppy diskettes, rigid diskettes, magnetic tape, and the like. In the example of FIG. 2, a disk drive 200 includes a spindle 202 for supporting and rotating a disk 204. The spindle 202 is rotated by a motor 206 which is controlled by motor control circuitry 208. A magnetic head 210 is mounted on a slider 212 supported by a suspension and actuator 214. The head 210 may also be referred to as a "magnetic read/write transducer", or simply a "head". The head 210 may comprise an MR read head and/or an inductive write head, for example. The suspension and actuator 214 positions the slider 212 so that the magnetic head 210 is in a transducing relationship with a surface of the disk 204.

When the disk 204 is rotated by the motor 206, air moved by the top of the disk together with the structure of the slider 212 causes the slider 212 to ride on a cushion of air, referred to as an air bearing. The thickness of the air bearing, also referred to as the "flying height" of the slider 212, is typically less than 5.0 microinches. As the slider 212 rides on the air bearing, the magnetic head 210 is employed for writing and reading information in multiple circular tracks on the surface of the disk 204. This information, which includes data signals as well as servo signals for moving the slider to various tracks, is processed by drive electronics 216, electrically connected to the actuator 214.

SLIDER COMPONENTS & INTERCONNECTIONS

Overall Slider Structure

Figure 3:
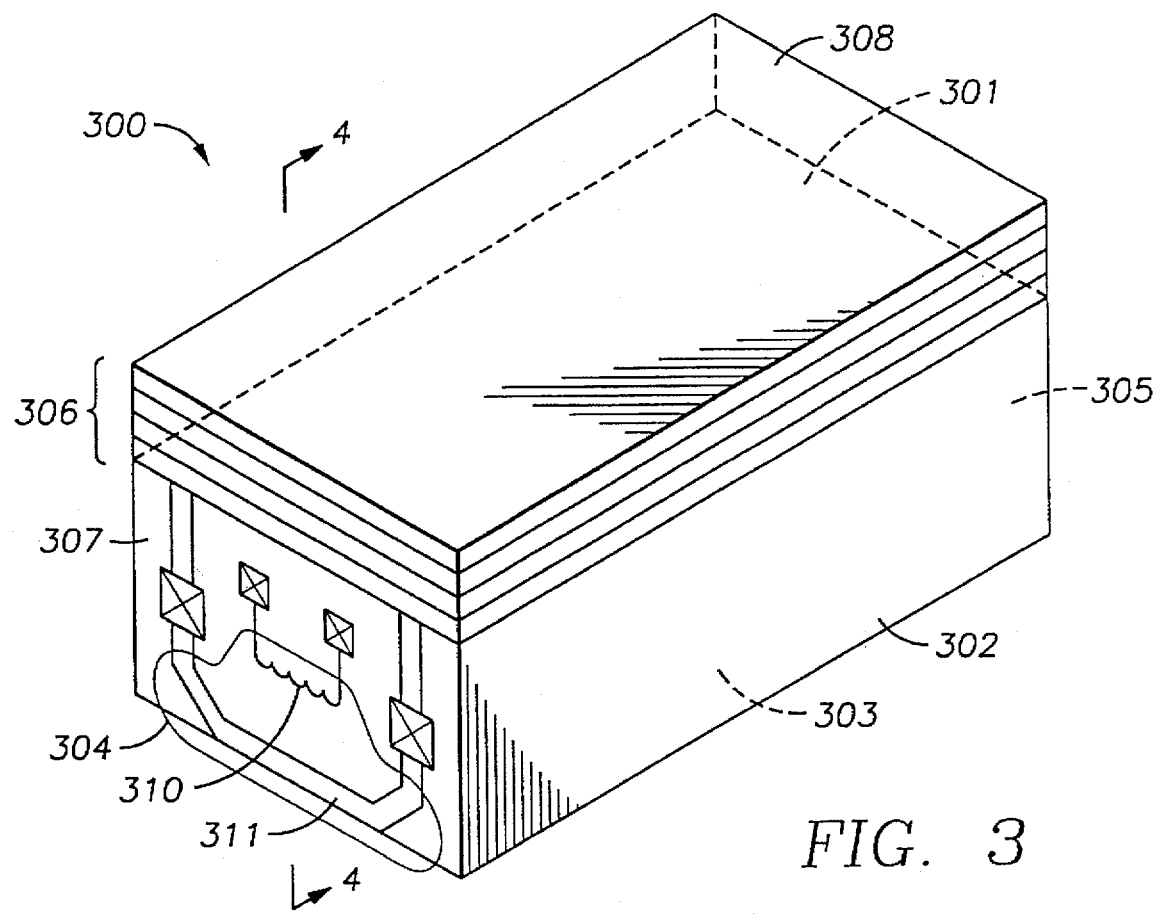
FIG. 3 is a perspective view of a thin film slider in accordance with the present invention.

FIG. 3 shows the slider of the invention in greater detail. The slider 300 preferably includes a substrate 302 or "slider body" having dimensions of about 1 mm×2 mm×0.4 mm. The substrate 302 preferably comprises silicon, or another composition such as "N58" (i.e. a combination of TiC and $Al_2O_3$). The substrate 302 includes an air bearing surface 303 and an upper surface 301 opposing the air bearing surface 303. The substrate 302 also includes a leading end 305 and an opposing trailing or deposit end 307.

The deposit end 307 of the substrate 302 contains a head 304, which "writes" (records) electromagnetic data signals on a magnetic data storage medium such as a disk, and also "reads" (reproduces) electromagnetic data signals from the storage medium. The head 304 also includes an inductive coil 310 and an MR sensor 311, discussed in greater detail below. Generally, the inductive coil 310 writes data to data storage media and the MR sensor 311 reads data from the media. The head 304 also includes conductive pads (not shown) or various other interconnecting devices to achieve a convenient electrical connection with the layers of a multi-layer accessory circuit 306.

The multi-layer accessory circuit 306 resides upon the upper surface 301, and includes a number of layers of circuitry lying generally parallel to the bearing surface 303. The accessory circuit 306 may also be called an "electronic module". The uppermost one of the layers 306 has a backside surface 308. Preferably, each of the layers 306 comprises a layer of silicon other between about 10–100 μm thick containing a multiplicity of interconnected VLSI transistors and other components arranged to provide certain desired circuit components. These circuit components, for example, may comprise memory circuits, pre-amplifiers, ESD protection devices, and other circuits appropriate to the intended application of the slider 300, as described in further detail below.

The layers 306 may be constructed using the "CUBE" process, which is a known method of creating layered circuits whose interconnections are primarily provided across edges of the circuits. The CUBE process minimizes the footprint of a circuit by creating a "high-rise" made up of multiple circuit layers. The CUBE process is disclosed in the following references, which are incorporated herein by reference:

1. Claude L. Bertin, et al., "Evaluation of a Three-Dimensional Memory Cube System", IEEE Transactions on Components, Hybrids, and Manufacturing Technology, Vol. 16, No. 8, December 1993;

2. Clark, U.S. Pat. No. 4,403,238, issued Sep. 6, 1983; and

3. Carson, et al., U.S. Pat. No. 4,646,128, issued Feb. 24, 1987.

For ease of interconnection, each circuitry layer of the accessory circuit 306 preferably includes "transfer metals", which extend toward the deposit end 307 of the substrate 302. The transfer metals, also called "transfer metallurgy", preferably comprise various spans of deposited conductive film, although metal leads or other connective means may be used. The transfer metals are interconnected to appropriate components of the head 304 through interconnecting devices such as gold pads, for example. Additionally, the accessory circuit 306 includes conductive pads (not shown) to electrically connect the circuit 306 to off-slider components, such as a conductive channel that leads to various arm electronics of a head gimbal assembly. These pads must be provided upon the top-most surface of the top layer of accessory circuit 306, as well as the edge of the accessory circuit provided parallel to by the deposit end 307.

Accessory Circuitry

As mentioned above, the layers of accessory circuitry 306 may provide different functions, as required by the particular application. In one example, the layers 306 may be constructed to provide the circuitry 400 schematically illustrated in FIG. 4. Here, the circuitry 400 includes a DRAM cache 402, sense circuitry 404, and a pre-amplifier circuit 406. The sense circuitry 404 and pre-amplifier 406 are electrically coupled to the MR sensor 311 as shown by the interconnections 408. Moreover, the sense circuitry 404 is coupled to the DRAM cache 402. Both the DRAM cache 402 and the pre-amplifier 406 are electrically coupled to the actuator 214.

In this arrangement, the pre-amplifier 406 applies a contant current to the MR sensor; when the MR sensor experiences magnetic fields from a nearby data storage medium, the resistance of the MR sensor 311 changes. The sense circuitry 404 detects this change by monitoring the voltage across the MR sensor 311. Data obtained by the sense circuitry 404 is directed to the cache 402 to optimize access of the media.

If the slider body 302 is about 1 mm×2 mm (as in the illustrated example), each layer of the accessory circuit 306 may easily contain a 64 Kb or 256 Kb block of random access memory. Therefore, with a stack of 3–4 layers, the DRAM cache 402 may have a storage capacity of about 1.024 Mb.

Figure 4:
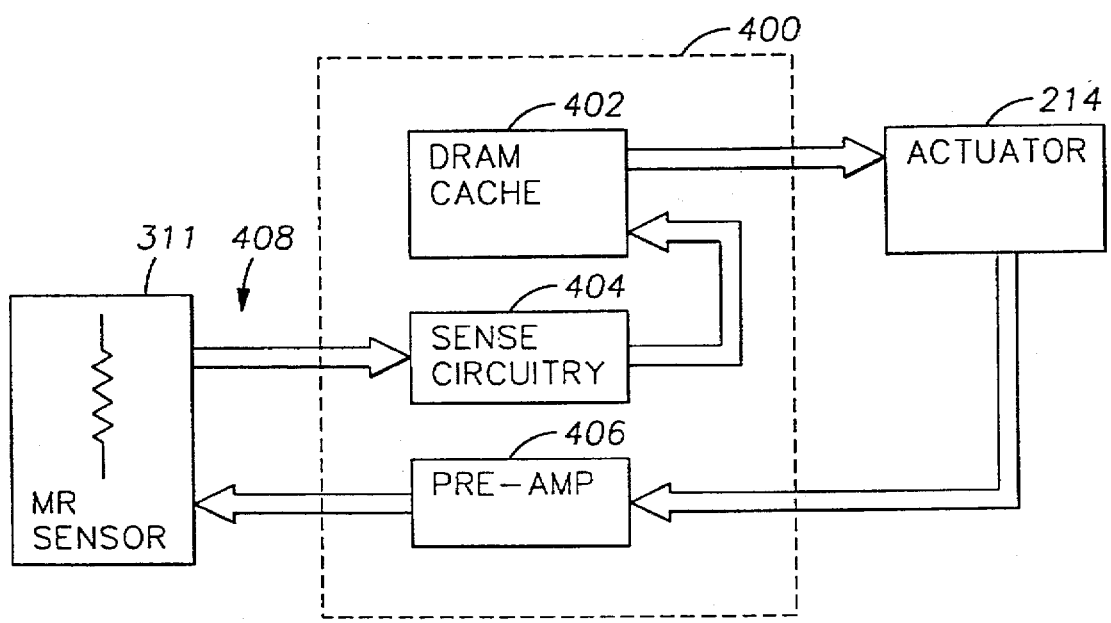
FIG. 4 is a is a schematic diagram of an exemplary accessory circuit in accordance with the present invention.

Although not shown in FIG. 4, the circuitry 400 may also include various electrostatic discharge ("ESD") protection devices, also called "overvoltage clamps." Some examples include diode-based protective devices such as SCRs, varistors, thyristors, and zener diodes. The ESD protection devices are preferably connected to the conductive pads (discussed above), which are provided for connection to various off-slider circuitry such as a conductive channel leading to an arm electronics module.

MR Sensor Components

Figure 5:
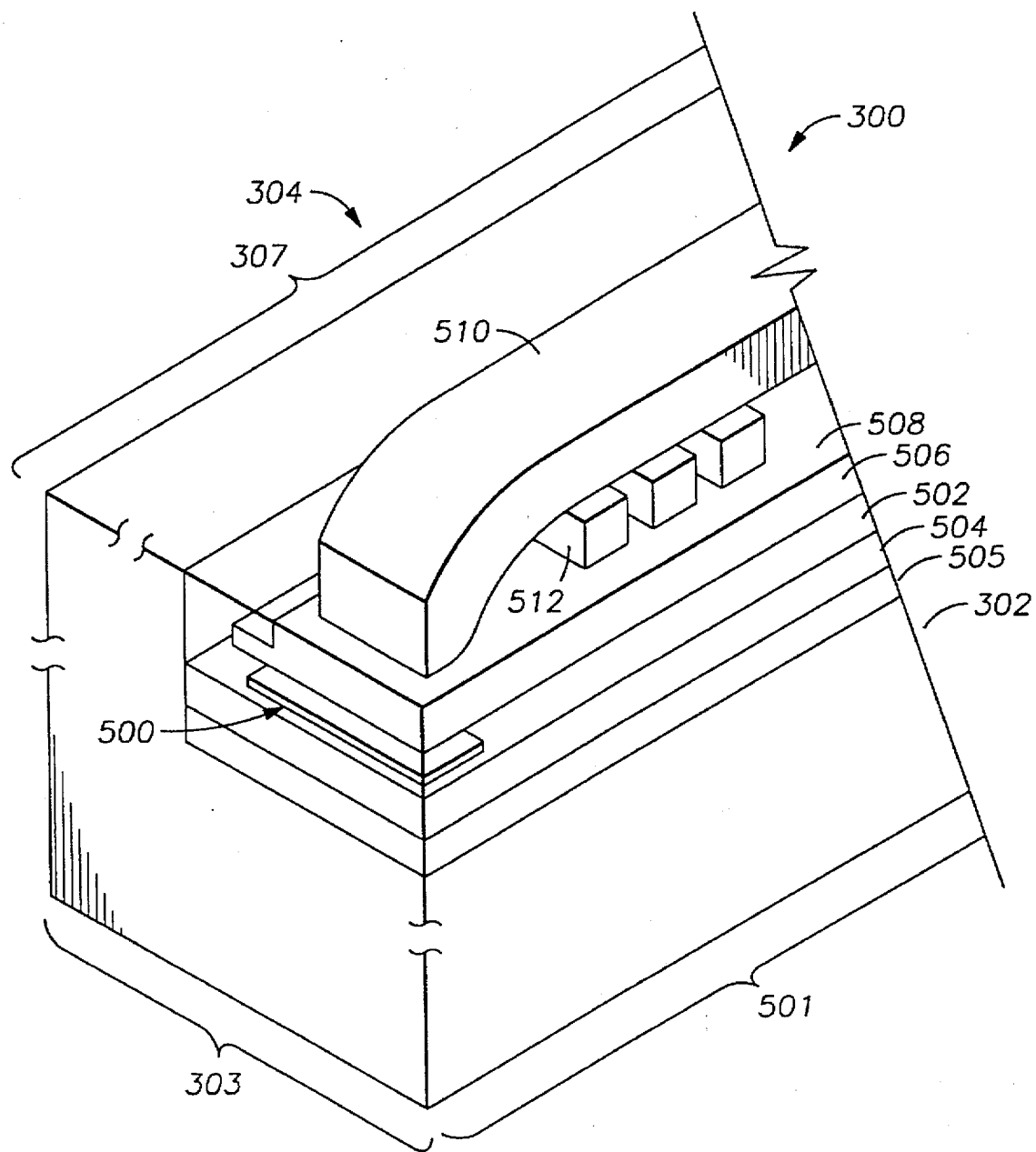
FIG. 5 is a cross-sectional perspective view highlighting a head of the invention, depicting the cross-sectional surface formed along the line 4—4 of FIG. 3.
Figure 6:
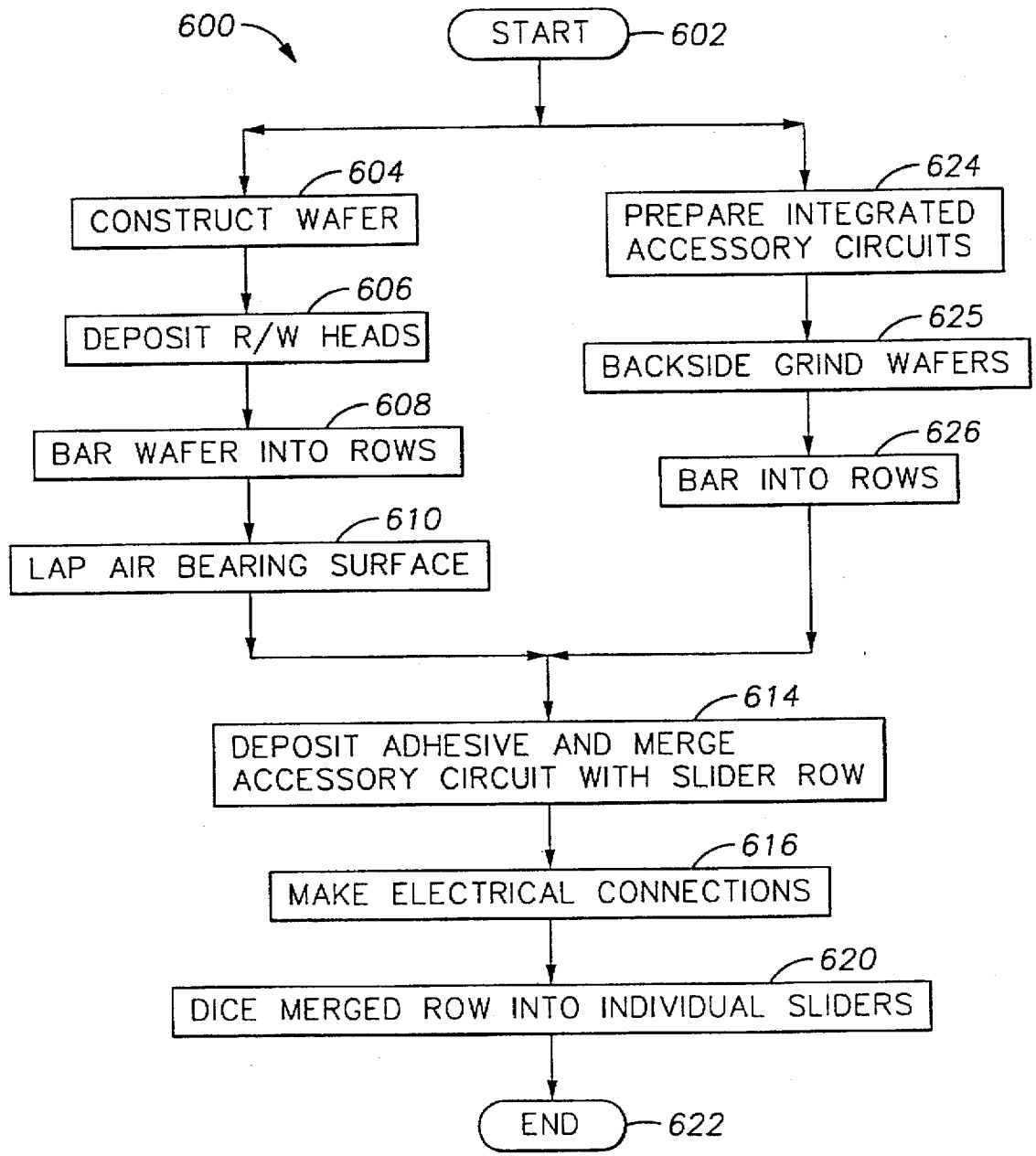
FIG. 6 is a flowchart of process steps to implement one embodiment of the invention.
Figure 7:
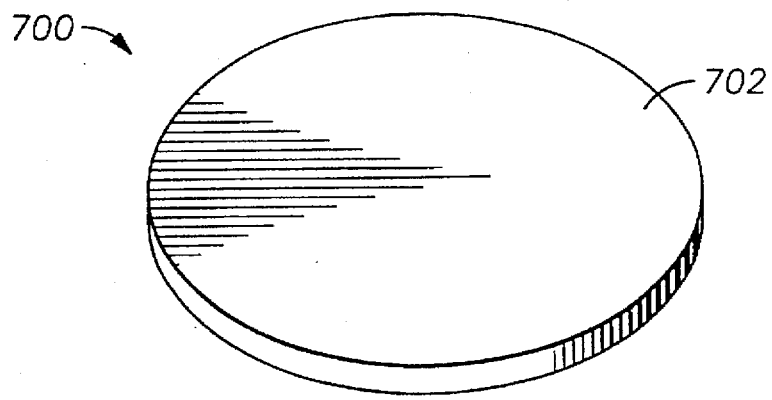
FIG. 7 is a perspective view of a wafer substrate, in accordance with the invention.

Referring to FIG. 5, the slider 300 is shown in greater detail to explain the components of the head 304. Particularly, FIG. 5 displays a cross-sectional surface 501 created by sectioning the slider 300 along the line 4—4 (FIG. 3). FIG. 5 therefore illustrates the cross-sectional surface 501, air bearing surface 303, and deposit end 307 of the slider 300 in relation to the components of the head 304. While the description herein describes a single MR head carried by the slider, it should be understood that the slider may carry a plurality of MR heads according to the teachings of the present invention.

As shown in FIG. 5, the head 304 includes a number of different components. The MR components of the head 304 include an MR stripe and conductor leads 500 embedded between a pair of read gaps 502. As an example, the MR stripe 500 may be manufactured from a magnetic material such as a combination of iron and nickel (e.g. "permalloy"), or another suitable material. The read gaps 502 are preferably made from an insulator such as alumina (i.e. $Al_2O_3$) or another oxide material. The read gaps 502 are in turn sandwiched between a first shield 504 ("S1") and a second shield 506 ("S2") . The second shield 506 may also be referred to as "P1," because it also acts as a first pole tip for an inductive write transducer. In an exemplary embodiment, the first shield 504 may comprise Sendust material, which contains about 85 percent iron, 6 percent aluminum, and 9 percent silicon. The second shield 506 may comprise an iron-nickel compound or another suitable magnetic material.

The first shield 504 is separated from the slider body 302 by an undercoat 505, which may comprise a layer of a suitable insulator, such as alumina for example. The second shield 506 underlies a write gap insulation layer 508, which together with a second pole tip 510 ("P2") encloses a series of inductive write coils 512 to form the inductive write transducer. In an exemplary embodiment, the write gap insulation layer 508 may comprise an insulator such as alumina or another suitable non-magnetic material. The coils 512 preferably comprise layered copper coils.

A sense current is transmitted to the MR stripe 500 by a pair of conductor leads, preferably made from an electrically conductive material such as copper or tantalum. The head 304 performs a write function when magnetic flux bridges across the gap 508 in response to magnetic flux being induced into the first and second pole tips 510, 506 by the coils 512. A read function is performed by the head 304 when magnetic fields on a moving data storage medium cause a change of resistance in the MR stripe. This resistance change causes a change in the voltage developed across the MR stripe. These variations in voltage are processed into information signals.

It is important that the MR stripe 500 be protected from ESD during its construction and installation in a data storage drive. A few volts can destroy or damage the MR stripe 500, rendering the read function of the head 304 inoperative. Preferably, the MR stripe 500 is protected from ESD by incorporating the features disclosed in U.S. patent application Ser. No. 08/324,841, entitled "Silicon Chip with an Integrated Magnetoresistive Head Mounted on a Slider", filed on Oct. 18, 1994 in the names of Voldman et al. The '841 application is incorporated herein by reference in its entirety.

SLIDER MANUFACTURE

FIGS. 6–9 illustrate a number of process steps 600 for manufacturing a slider in accordance with a representative embodiment of the invention. After the process starts in task 602, a wafer substrate 700 (FIG. 7) is constructed in task 604. The wafer substrate 700 may comprise a disk-shaped slice of a cylindrical ingot (not shown) of a suitable material, the slice having a substantially flat deposit surface 702 for hosting read and/or write heads of multiple sliders to be cut from the wafer. The wafer substrate 700 is preferably made of silicon, although another substance may be used, such as N58. The wafer 700 may also include an overcoat (not shown) comprising a barrier or insulator layer such as $Al_2O_3$. Depending upon the size of the wafer 700 and the sliders to be cut, one wafer 700 may produce from 500 to 10,000 individual sliders.

After task 604, read and/or write heads (not shown) for each future slider of the wafer 700 are deposited onto the wafer's deposit surface 702. These components include, for example, inductive pole pieces, MR elements, shields, and the like, as discussed above with reference to FIG. 5. These components are made from various insulators, magnetic and conductive metals, and other materials different than the substrate, as is known in the art.

Figure 8:
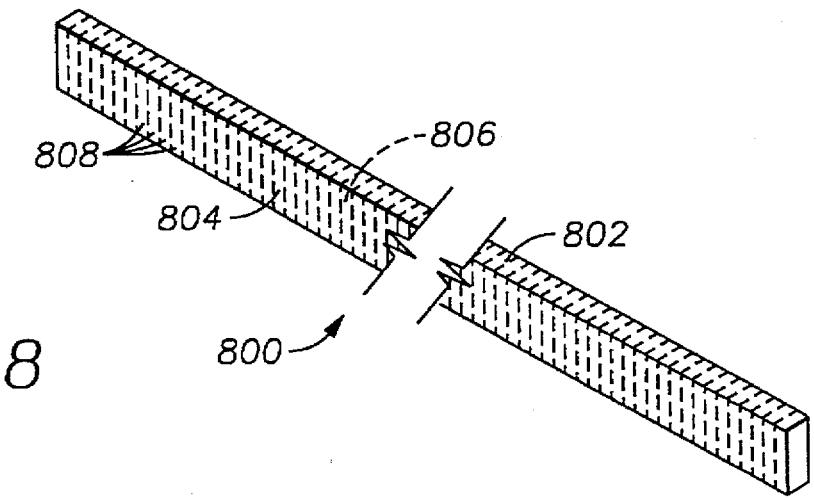
FIG. 8 is a perspective view of a row barred from a wafer substrate, in accordance with the invention.

Next, in task 608, the wafer 700 is cut or "barred" into individual substrate rows, such as the slider row 800 (FIG. 8). The slider row 800, also called a "bar" of sliders, contains a plurality of future sliders 808. Although the read and write heads of the future sliders 808 have already been deposited on the slider row 800, boundaries of the sliders 800 appear in FIG. 8 as dotted lines, because the slider row 800 has yet to be cut or "diced" into individual sliders. The slider row 800 has a "deposit end" 802 (corresponding to the deposit surface 702), which contains the previously deposited read and write heads of the future sliders 808. The slider row 800 also includes an air bearing surface 804 and an upper surface 806. The slider row 800 may have dimensions of about 47 mm×2 mm×0.5 mm, for example. If desired, prior to task 608 the wafer 700 may undergo backside grinding to reduce its thickness. After task 608, task 610 is performed to smooth the air bearing surface 804 using etching, lapping and polishing techniques, such as conventional techniques, to produce sliders with precise dimensions.

Concurrently with tasks 604–610, or at some previous time, tasks 624–626 are performed to construct rows of accessory circuits (not shown) for later merging with a like number of slider rows. Specifically, a wafer (not shown) of the accessory circuits is first prepared in task 624. Next, in task 625, the wafer undergoes backside grinding if necessary to reduce the wafer's thickness. Through backside grinding, the accessory circuits wafer may be reduced in thickness from 350 microns to 100 microns, for example. Finally, the wafer is barred into accessory circuit rows in task 626.

After completion of tasks 612 and 626, accessory circuit rows and slider rows are paired and merged in task 614. Merging of each accessory circuit row with a corresponding slider row is accomplished by depositing adhesive upon the upper surface of the slider row and then placing the accessory circuit row against the slider row's upper surface 806. The rows are initially adhered by the uncured polyimide adhesive, which may be strengthened by baking the merged rows to cure the polyimide adhesive. Subsequent layers of the accessory circuit may be sequentially merged to previously laid accessory circuit layers.

After task 614, the accessory circuit row and slider row are electrically connected in task 616. As shown in FIG. 3, appropriate edge interconnections of the multi-layer accessory circuit 306 are electrically connected to components of the head 304 along the edge of the merged structure.

Figure 9:
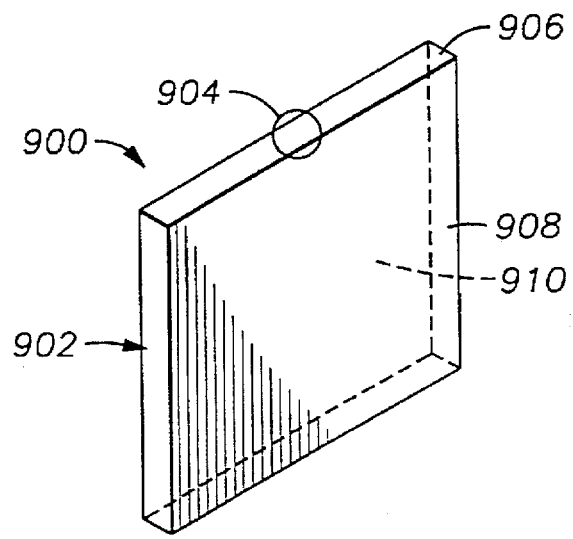
FIG. 9 is a perspective view of a slider diced from a row, in accordance with the invention.

Finally, in task 620 the merged row is cut or "diced" into individual sliders, such as the slider 900 (FIG. 9). The slider 900 includes a substrate 902 and a comparatively small head, which is not shown but occupies an area 904. The head 904 is deposited along the deposit end 702 of the substrate 700 (FIG. 7), shown as a deposit end 906 of the slider 900. Prior to cutting the row 800 into individual sliders, the deposit end 906 of the individual slider 900 (FIG. 9) constituted part of the deposit surface 802 of the row 800 (FIG. 8). The slider 900 also includes an air bearing surface 908, corresponding to the air bearing surface 804, and an upper surface 910, corresponding to the upper surface 806.

The above-described process therefore provides sliders, each of which includes a substrate having an air bearing surface, an adjacent surface having a head, and an upper surface bonded to a multi-layer accessory circuit that is electrically connected to the head along an edge provided by the deposit end.

While there have been shown what are presently considered to be preferred embodiments of the invention, it will be apparent to those skilled in the art that various changes and modifications can be made herein without departing from the scope of the invention as defined by the appended claims.

What is claimed is:

1. An apparatus for exchanging electromagnetic signals with a magnetic recording medium, comprising:

a substrate including an air bearing surface, an upper surface opposing the bearing surface, and a deposit end adjoining the bearing surface and the upper surface;

an electromagnetic transducing head provided in the deposit end;

an accessory circuit including multiple substantially planar and substantially parallel stacked integrated circuit layers, each integrated circuit layer including a plurality of active circuit elements, said accessory circuit having a backside and also having an opposing underside adhered to the upper surface, each said integrated circuit layer being substantially planar and having an edge substantially coincident with the deposit end, each said integrated circuit layer including conductive pads located at the edge; and conductive vias spanning the edge to interconnect at least one conductive pad of each integrated circuit layer with at least one of the following: (1) at least one conductive pad of a different integrated circuit layer, and (2) the electromagnetic transducing head.

2. The apparatus of claim 1, further including remotely located arm electronics coupled to the accessory circuit by a conductive channel.

3. The apparatus of claim 1, further including an actuator arm having a tip to which the backside of the accessory circuit is mounted.

4. The apparatus of claim 1, the accessory circuit comprising a memory.

5. The apparatus of claim 4, the memory comprising a cache.

6. The apparatus of claim 4, the memory comprising a non-volatile memory.

7. The apparatus of claim 4, the memory comprising random access memory.

8. The apparatus of claim 1, the head comprising an MR head.

9. The apparatus of claim 8, the accessory circuit comprising a pre-amplifier to provide a predetermined voltage across the MR head.

10. The apparatus of claim 1, the head comprising an inductive write head.

11. The apparatus of claim 1, the accessory circuit comprising a sensing circuit to amplify electrical signals produced by the head.

12. The apparatus of claim 1, the accessory circuit comprising an ESD protection circuit to prevent damage to the transducing head caused by electrostatic discharge.

13. The apparatus of claim 1, the substrate comprising TiC and $Al_2O_3$.

14. The apparatus of claim 1, the substrate comprising silicon.

15. The apparatus of claim 1, further comprising a head gimbal assembly that includes:

an actuator arm having a first end and a second end, the accessory circuit backside being mounted to the first end;

an arm electronics unit mounted upon the second end of the actuator arm; and an electrically conductive channel interconnecting the arm electronics unit with at least one of the accessory circuit and the transducing head.

16. The apparatus of claim 15, further including a magnetic recording disk positioned proximate and substantially parallel to the air bearing surface of the substrate.

17. The apparatus of claim 1, the accessory circuit including multiple substantially parallel layers of circuitry adhered together, the layers having common edges substantially coincident with the deposit end, each circuitry layer including at least one conductive pad located at said layer's respective edge, the accessory circuit being coupled to the head by conductive vias spanning the edges and the deposit end and interconnecting the pads and the head.

18. An apparatus for electrically exchanging signals with a magnetic recording medium, comprising:

a substrate including an air bearing surface and a deposit end oriented at an angle to the air bearing surface;

a magnetic transducer accommodated by the deposit end;

an accessory circuit including multiple substantially planar and substantially parallel stacked integrated circuit layers, each integrated circuit layer including a plurality of transistors, said accessory circuit having a backside and an underside, said integrated circuit layer defining a common edge adjoining the backside and underside, the underside being adhered to the substrate such that the common edge is substantially aligned with the deposit end, each said integrated circuit layer including conductive pads located at the edge; and conductive vias spanning the common edge to interconnect conductive pads of each integrated circuit layer to at least one of the magnetic transducer and a different integrated circuit layer.

19. The apparatus of claim 18, the accessory circuit including multiple substantially parallel layers of circuitry adhered together, the layers having common edges substantially aligned with the deposit end, each circuitry layer including at least one conductive pad located at said layer's respective edge, the pads being coupled to the transducer by conductive vias running along the edges and the deposit end.

* * * * *